(12) United States Patent
Annen et al.

(10) Patent No.: US 11,867,086 B2
(45) Date of Patent: Jan. 9, 2024

(54) COATING COMPOSITION FOR SURFACE REPAIR OF TURBOMACHINE COMPONENTS AND COMPRESSOR COMPONENTS

(71) Applicant: Siemens Energy Global GmbH & Co. KG, Munich (DE)

(72) Inventors: Michael Annen, Duisburg (DE); Mario Brockschmidt, Essen (DE); Simone Friedle, Wuppertal (DE); Andrei Ghicov, Adelsdorf (DE); Sven Jacobi, Gevelsberg (DE); Manfred Kaulhausen, Meerbusch (DE); Stefan Krause, Krefeld (DE); Rayk Lagodka, Falkensee (DE); Frank Rainer, Oberhausen (DE); Christian Scherhag, Mülheim an der Ruhr (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 521 days.

(21) Appl. No.: 17/044,806

(22) PCT Filed: Apr. 16, 2019

(86) PCT No.: PCT/EP2019/059743
§ 371 (c)(1),
(2) Date: Oct. 1, 2020

(87) PCT Pub. No.: WO2019/201889
PCT Pub. Date: Oct. 24, 2019

(65) Prior Publication Data
US 2021/0156268 A1    May 27, 2021

(30) Foreign Application Priority Data
Apr. 17, 2018   (DE) ................ 10 2018 205 816.4

(51) Int. Cl.
*F01D 5/28*  (2006.01)
*C09D 7/40*  (2018.01)
(Continued)

(52) U.S. Cl.
CPC ............ *F01D 5/288* (2013.01); *C09D 5/103* (2013.01); *C09D 5/106* (2013.01); *C09D 7/61* (2018.01);
(Continued)

(58) Field of Classification Search
CPC ... F01D 5/005; F01D 5/12; F01D 5/14; F01D 5/28; F01D 5/284; F01D 5/286;
(Continued)

(56) References Cited

U.S. PATENT DOCUMENTS

| | | |
|---|---|---|
| 4,606,967 A | 8/1986 | Mosser |
| 2007/0298270 A1* | 12/2007 | Hazel ............... C23C 26/00 428/701 |

(Continued)

FOREIGN PATENT DOCUMENTS

| | | |
|---|---|---|
| CN | 105440882 A | 3/2016 |
| CN | 108047894 A | 5/2018 |

(Continued)

OTHER PUBLICATIONS

PCT International Search Report and Written Opinion of International Searching Authority dated Jul. 8, 2019 corresponding to PCT International Application No. PCT/EP2019/059743 filed Apr. 16, 2019.

*Primary Examiner* — Binh Q Tran

(57) ABSTRACT

A coating composition for coating of components of a flow machine, especially a turbomachine such as a gas turbine with compressor, or of a compressor, which are exposed to the fluid stream of the flow machine or of the compressor, wherein the coating composition includes anticorrosion pig- (Continued)

ments, wherein the coating composition includes hard material particles, and wherein the coating composition is an RT-curing, UV-curing and/or thermally curing coating composition. A component of a flow machine or of a compressor has the coating composition. A method of maintaining a flow machine or a compressor uses the coating composition.

12 Claims, 1 Drawing Sheet

(51) Int. Cl.
*C09D 7/61* (2018.01)
*C09D 5/10* (2006.01)
*F01D 5/00* (2006.01)
*C08K 3/14* (2006.01)
*C08K 3/40* (2006.01)
*C09D 5/08* (2006.01)
*C09D 5/04* (2006.01)

(52) U.S. Cl.
CPC .............. *C09D 7/69* (2018.01); *F01D 5/005* (2013.01); *C08K 3/14* (2013.01); *C08K 3/40* (2013.01); *C08K 2201/009* (2013.01); *C09D 5/04* (2013.01); *C09D 5/08* (2013.01); *C09D 5/082* (2013.01); *F05D 2230/90* (2013.01); *F05D 2260/95* (2013.01); *F05D 2300/611* (2013.01)

(58) Field of Classification Search
CPC ...... F01D 5/288; F01D 5/3084; F01D 25/007; F05D 2230/90; F05D 2240/31; F05D 2260/95; F05D 2300/611; F05D 2300/506; Y02T 50/60; C09D 5/038; C09D 5/04; C09D 5/08; C09D 5/082; C09D 5/10; C09D 5/103; C09D 5/106; C09D 5/4496; C09D 7/61; C09D 7/69; C09D 17/004; C09D 17/006; C09D 17/007; C08K 2003/0812; C08K 2003/0893; C08K 3/14; C08K 3/40; C08K 2201/009; C23F 15/00; C23F 15/005; C23C 2/06; C23C 2/12; C23C 14/0635; C23C 14/10; C23C 18/10; C23C 18/1212; C23C 24/085; C23C 24/087; C23C 24/10; C23C 24/103; C23C 24/106; C23C 28/025; C23C 28/027; C23C 28/3225; C23C 28/324; C23C 28/34
See application file for complete search history.

(56) References Cited

U.S. PATENT DOCUMENTS

| | | | | |
|---|---|---|---|---|
| 2008/0159870 | A1* | 7/2008 | Hong | F04D 29/644 416/224 |
| 2009/0130304 | A1* | 5/2009 | Muth | B05D 7/582 427/180 |
| 2011/0070428 | A1* | 3/2011 | Skoog | C23C 24/00 428/335 |
| 2014/0234096 | A1* | 8/2014 | Klam | C23C 28/42 415/217.1 |
| 2015/0003996 | A1 | 1/2015 | Krishna et al. | |
| 2016/0169009 | A1 | 6/2016 | Okamoto et al. | |
| 2016/0215630 | A1 | 7/2016 | Krishna et al. | |
| 2018/0258776 | A1* | 9/2018 | Hewitt | C23C 28/321 |

FOREIGN PATENT DOCUMENTS

| | | |
|---|---|---|
| CN | 108395785 A | 8/2018 |
| DE | 102014109339 A1 | 1/2015 |
| EP | 2821449 A1 | 1/2015 |

* cited by examiner

COATING COMPOSITION FOR SURFACE REPAIR OF TURBOMACHINE COMPONENTS AND COMPRESSOR COMPONENTS

CROSS REFERENCE TO RELATED APPLICATIONS

This application is the US National Stage of International Application No. PCT/EP2019/059743 filed 16 Apr. 2019, and claims the benefit thereof. The International Application claims the benefit of German Application No. DE 10 2018 205 816.4 filed 17 Apr. 2018. All of the applications are incorporated by reference herein in their entirety.

FIELD OF INVENTION

The invention relates to a coating composition for coating of highly stressed components of flow machines, especially turbo machines such as gas turbines with compressor, and compressors. The invention further relates to a method of coating highly stressed components of flow machines, such as turbo machines, and compressors using such a coating composition. The invention further relates to a method of maintaining a flow machine, especially a turbo machine, or a compressor using such a coating composition. The present invention further relates to a constituent of a flow machine, such as a turbo machine, or a compressor, comprising a coating, produced using the aforementioned coating composition.

BACKGROUND OF INVENTION

Particular components of flow machines, for example turbo machines especially including gas turbines with a compressor, and compressors, are subject to high stresses during operation. Particular emphasis is given here to the constituents that are exposed to the fluid stream within the compressor or the flow machine. As well as the high temperatures and the pressure, particular mention should be made here of mechanical stresses, for example owing to small particles that are entrained with the fluid stream. When they hit the surface of the components, these can also cause flaking-off of coatings present thereon that are typically required for the operation of the components. The source of such particles is, for example, particles that get into the interior of the compressor or of the flow machine with the fluid, or particles that result from erosion processes in the interior of the compressor or the flow machine. For example, it is also possible for secondary processes, through damage to the coatings or surfaces in the interior of the turbo machine, to give rise to new particles that are entrained in the fluid stream and hit the downstream surfaces. Consequently, it is necessary to remedy corresponding damage to the components in the course of maintenance work.

A particular challenge here, however, is still to perform maintenance as quickly as possible, especially in order to reduce downtime of the compressor or of the flow machine. However, providing corresponding replacement parts across the board is typically a problem here since the costs of these are very high. Even knowing which parts have to be replaced, the costs associated therewith typically make such a system uneconomic. There is therefore a need for a flexible maintenance method that firstly enables rapid maintenance and secondly provides the high reliability required for such compressors or flow machines. More particularly, this is important for the maintenance of flow machines.

SUMMARY OF INVENTION

It is therefore an object of the present invention to provide a solution to this problem, which especially enables rapid and reliable maintenance of corresponding compressors and flow machines.

These and further objects that have not been stated explicitly beforehand are achieved by the invention disclosed herein and the specific embodiments as disclosed hereinafter.

In one aspect, the present invention relates to a coating composition for coating of components of a flow machine, especially a turbo machine or compressor, that are exposed to the fluid stream of the flow machine or the compressor, wherein the coating composition comprises anticorrosion pigments, wherein the coating composition comprises hard material particles, and wherein the coating composition is an RT-curing (room temperature-curing), UV-curing and/or thermally curing coating composition. It has been found that the combination of anticorrosion pigments with hard material particles enables the provision of a coating composition suitable for enabling rapid and reliable repair to damaged surfaces of flow machine components, especially turbo machine components, or compressor components. More particularly, it is possible thereby to conduct repairs in situ in a short time, fulfilling the high demands on the subsequent stress on the components in the course of use in a flow machine or a compressor. For example, it was possible to obtain good results for the coating of, for example, components of a steam turbine. More particularly, however, the coating composition of the invention has been found to be advantageous for coating of components of a turbo machine. Particularly good results were achieved here in the treatment of components in the compressor area of the turbo machine. Corresponding turbo machines are encountered, for example, in stationary operation for generation of power or, for example, as mobile units in the form of aircraft engines.

In a further aspect, the present invention relates to a component of a flow machine or of a compressor, said component being suitable for exposure to the fluid stream of the flow machine or of the compressor, wherein the component has, on the side exposed to the fluid stream, a coating that has been obtained by means of the coating composition of the invention.

In a further aspect, the present invention relates to a method of maintaining a flow machine or a compressor using the coating composition of the invention. It is naturally also possible to utilize the coating composition of the invention to cover new components, but it has been found to be especially advantageous in maintenance work.

In a further aspect, the present invention relates to the use of the coating composition of the invention for maintenance of a flow machine or a compressor.

The use of just one of the aforementioned curing systems selected from the group consisting of RT-curing (room temperature-curing), UV-curing or thermally curing coating compositions has been found to be especially advantageous in order to provide simple and reliable coating compositions. In these cases, it is advantageous that the coating composition is either RT-curing, UV-curing or thermally curing. However, the combination of various curing mechanisms is also possible in order to obtain more complex coating compositions with particular advantages. For example, in the case of alternative embodiments, it is advantageous that the coating composition cures by at least 2 modes of the modes mentioned. For example, it is advantageous to provide a coating composition that is both UV-curing and RT-curing. By means of UV curing, it is possible here to quickly achieve thorough curing. Subsequently, by means of isocyanate crosslinking, for example, based on a reaction with the water present in the air, final curing of the coating composition can be effected. This also enables, for example, use at sites that are accessible only with difficulty by means of a UV light source. At the same time, the coating composition can generally be rapidly partly cured by means of UV light, in order to directly permit the handling of the coated articles.

In further embodiments of the present invention, the anticorrosion pigments are selected from the group consisting of aluminum particles, zinc particles and mixtures thereof. These anticorrosion pigments are found to be particularly advantageous in order to obtain a protective effect of the coating which is reliable over a long period.

It has also been observed that the choice of hard material particles typically has major effects on the long-term stability of the coating. Particularly advantageous coatings were obtained when the hard material particles comprise ceramic particles, glass particles, carbides and mixtures thereof. Hard material particles advantageously comprise particles from the group consisting of alumina particles, silica particles, carbides such as tungsten carbide, and mixtures thereof. Advantageously at least 50% by weight, more advantageously at least 70% by weight, even more advantageously at least 80% by weight, of the hard material particles are particles of alumina, silica, carbides and mixtures thereof. More particularly, it is advantageous that the hard material particles consist to an extent of at least 99% by weight of alumina, silica, carbides or mixtures thereof. Particularly advantageous hard material particles are alumina particles and silica particles, especially silica particles.

It is further advantageous in further embodiments when the total amount of the anticorrosion pigments and hard material particles is in the range from 10% by weight to 80% by weight, more advantageously in the range from 18% by weight to 72% by weight, even more advantageously in the range from 22% by weight to 68% by weight, based on the total weight of the coating composition. For typical applications, it has especially been found to be advantageous when the upper limit in the aforementioned total amount is lowered further. In this case, the total amount of the anticorrosion pigments and hard material particles here is in the range from 10% by weight to 45% by weight, more advantageously in the range from 18% by weight to 43% by weight, even more advantageously in the range from 22% by weight to 41% by weight. These embodiments are especially notable for ease of processability and can for example be applied in a particularly simple manner by means of application methods using a transfer medium for paint transfer such as a brush or a roller, without any noticeable reduction in the protective action here. Although the aforementioned methods have proved to be particularly advantageous, it is also possible to use methods such as spraying methods. The total weight of the coating composition here refers to the weight of the functioning coating composition. In the case of an RT-curing coating composition in the form of a 2K (two-component) coating composition consisting of the paint base and curing agent, the total weight of the coating composition thus also includes the weight of the curing agent.

For typical applications, it was also found to be advantageous when the hard material particles have a $D_{50}$ in the range from 10 µm to 70 µm, more advantageously in the range from 13 µm to 60 µm, even more advantageously in the range from 18 µm to 50 µm. Such hard material particles, for typical applications, seem to provide a particularly good mixture of ease of applicability by conventional methods such as paint transfer methods using a brush or roller, for example, and simultaneously good long-term stability of the finished coating.

The expression "D50" in the context of the present invention is the particle size where 50% of the particle size distribution is below the aforementioned value. Advantageously, for this purpose, the particle size distribution that has been volume-averaged by means of laser granulometry is utilized. The measurements may be performed, for example, with the HELOS particle size analyzer from Sympatec GmbH, Clausthal-Zellerfeld, Germany. A dry powder can be dispersed here with a Rodos T4.1 dispersing unit at a primary pressure of 4 bar, for example. Alternatively, the size distribution curve of the particles can be measured, for example, with a Quantachrome instrument (instrument: Cilas 1064) according to the manufacturer's instructions. For this purpose, 1.5 g of the pulverulent coating material are dispersed in about 100 ml of ethanol, and the mixture is treated in an ultrasound bath (instrument: Sonorex IK 52, from Bandelin) for 300 seconds and then introduced by means of a Pasteur pipette into the sample preparation cell of the measuring instrument and analyzed repeatedly. Such a method using a liquid-dispersed sample is typically advantageous. The individual measurement results are used to form the resulting averages. The scattered light signals are evaluated by the Fraunhofer method.

It has been found to be particularly advantageous for maintenance operations in situ when an RT-curing coating composition has been used for the coating composition. Such coating compositions cure after application, for example, through evaporation of a solvent or through chemical reaction of the constituents of the coating composition. More particularly, activation of the curing process does not require UV radiation or heating, which means that the corresponding coating composition, for example after application at a site which is difficult to access, cures at 25° C., for example, without requiring further steps. A particularly advantageous group of these coating compositions is that of the 2K coating compositions that are activated by mixing the two components. As well as the excellent stability of the coating composition in the unmixed state, this especially offers very rapid curing after mixing of the components (paint base and curing agent). Since no activation need be undertaken in the applied state by means of UV light or heat in particular, it is also possible to apply a corresponding coating and cure it rapidly and reliably even on regions of the flow machine or of the compressor that are difficult to access.

Particularly advantageous forms of such an RT-curing coating composition are 2K coating compositions comprising a paint base and a curing agent, wherein the ratio of paint base to curing agent is in the range from 1:1 to 7:1, more advantageously in the range from 1.6:1 to 6.5:1, even more advantageously in the range from 1.9:1 to 6.2:1. For typical applications, it has especially been found to be advantageous when the ratio of paint base to curing agent is in the range from 4:1 to 7:1, more advantageously in the range from 4.2:1 to 6.5:1, even more advantageously in the range from 4.5:1 to 6.2:1. These are found to be particularly advantageous owing to their good processability. Advantageously, the 2K coating composition is an epoxy-based coating composition.

Particularly advantageous epoxy derivatives for the epoxy-based coating compositions have been found to be aminically curing epoxy resins, especially aminically curing aromatic epoxy resins. These were especially advantageous for use in typical flow machines based on the use of fluids at high temperature.

In further embodiments, it is advantageous to utilize a UV-curing coating composition. This enables provision of the finished coating material even well before application and application thereof as required. This is especially advantageous for the present application since the exact need can be ascertained only after close inspection of the interior of the flow machine or the compressor. Even though the potentially higher time demands for a 2K coating composition are only slightly higher as a result of newly making up the active coating composition, this constitutes a noticeable advantage in respect of the very time-critical maintenance case of a flow machine or a compressor. Moreover, corresponding UV-curing paint compositions also enable very rapid curing operations within a few minutes. The controlled curing of the irradiated regions also enables removal of faults in the course of application, such as amounts of the coating composition that have dripped off, even at a very much later stage in a simple manner by simply wiping them off, for example.

Especially for maintenance operations that are to be conducted in situ, it has been found to be advantageous that the coating composition comprises a thixotropic agent, in which case the viscosity is adjusted to 40 to 240 seconds, advantageously to 50 to 200 seconds, more advantageously to 60 to 180 seconds, even more advantageously to 70 to 150 seconds, for a DIN 6 cup. The establishment of such a viscosity enables easy application of the coating composition to a wide variety of different alignments of surfaces, without the coating composition running off too easily.

In further embodiments, it is advantageous that the coating composition comprises a thixotropic agent and that the viscosity of the coating composition is in the range from 8000 mPas to 32 000 mPas, more advantageously in the range from 9000 mPas to 30 000 mPas, even more advantageously in the range from 10 000 mPas to 27 000 mPas, even more advantageously in the range from 11 000 mPas to 25 000 mPas. The viscosity can be measured, for example, with a Haake 500 viscometer. In this way, surprisingly advantageous results were achieved, and it was possible to obtain a reliable coating under difficult conditions by simple means. Especially for operations in situ, for example in a gas turbine in a power plant, it is possible in this way to achieve an excellent result. More particularly, it is possible to dispense with extensive technical aids for application and control thereof without any observation of losses in reliability of the newly coated component obtained.

It has also been found to be advantageous when the coating composition comprises at least one deaerating agent. This resulted in a further simplification of the application process since a particularly uniform result is achieved here even in the case of less cautious application of the coating composition. Especially for assurance of uniform coating quality, even in the case of a wide variety of different external conditions and changing maintenance personnel, such coating compositions are found to particularly advantageous.

It has also been found to be advantageous when the inventive component of a flow machine or of a compressor is coated in such a way that the coating composition of the invention is used in order to obtain the outermost coating layer or the second-from-outermost coating layer. Since the coating obtained by means of the coating composition of the invention provides exceptional protective action, it was found to be particularly advantageous when the corresponding layer of the coating is arranged at least largely on the outside. Although it is possible here to also apply a sealing protective layer to the coating layer of the invention, it is especially advantageous that the layer obtained by means of the coating composition of the invention is disposed on the outside. In this way too, sufficient stability is typically achieved, and the additional working step of additional sealing is dispensed with.

It is typically advantageous when the coating produced by means of the coating composition of the invention has an average minimum thickness of 100 µm, more advantageously 150 µm, even more advantageously 190 µm. More particularly, it is possible here to achieve stable coatings even under severe stress. The average minimum thickness is the arithmetic average thickness of the coating measured at right angles to the surface of the coated component.

The coating composition of the invention has been found to be particularly advantageous for applications where moderate temperatures are attained during operation. More particularly, particularly good long-term stability can be observed in these regions. Therefore, the coating composition of the invention is advantageously used for a steam turbine, the compressor region of a turbo machine or a compressor, more advantageously for the compressor region of a turbo machine or a compressor, even more advantageously for the compressor region of a turbo machine. Accordingly, the correspondingly coated components of the invention advantageously also originate from these specified machines or parts of the machines, and the method of the invention and the use of the invention advantageously relate thereto.

More particularly, it is further advantageous that the flow machine is a turbo machine comprising a compressor, and that the component is selected from the group of the rotor blades and guide vanes of the compressor of the turbo machine or the rotor blades and guide vanes of the compressor. Such turbo machine components profit to a very particular degree from the use of the coating composition of the invention.

In addition, the coating composition of the invention was found to be particularly advantageous when the component to be maintained is coated in situ. Especially in the case of the advantageous embodiments as specified above, it is also possible in this way to achieve excellent results without any great apparatus complexity.

It is also a feature of the coating composition of the invention and especially of the aforementioned advantageous embodiments that the component to be maintained often does not have to be deinstalled from the flow machine or the compressor for typical maintenance operations. Instead, it is possible in a simple manner, after the opening of the flow channel of the fluid, to apply a new coating to the damaged components of the flow machine or the compressor.

Moreover, the inventive use of the coating composition of the invention advantageously comprises the at least partial coating of at least one rotor blade or guide vane of a compressor of the flow machine or at least one rotor blade or guide vane of the compressor. Use in the region of the compressor of a turbo machine has been found to be particularly advantageous.

BRIEF DESCRIPTION OF THE DRAWINGS

Further details are included in the description of the figures that follows. The specific embodiments here consti

DETAILED DESCRIPTION OF INVENTION

Figure 1:
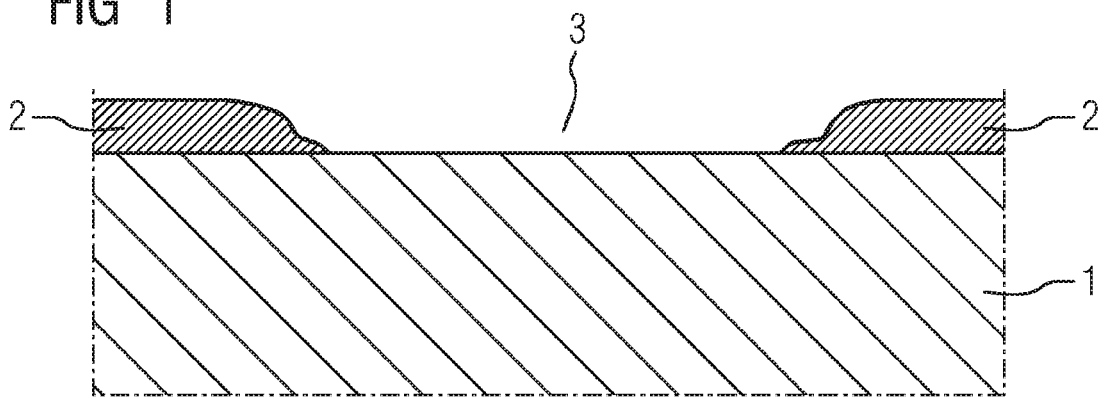
- FIG. 1 shows the detail from a schematic cross section of a turbo machine blade from the compressor of a turbo machine that has surface damage.

FIG. 1 shows the detail from a schematic cross section of a turbo machine blade 1 from the compressor of a turbo machine. As a result of mechanical damage during operation, the coating 2 was damaged. This damage resulted in the damage site 3 in the coating on the turbo machine blade.

Figure 2:
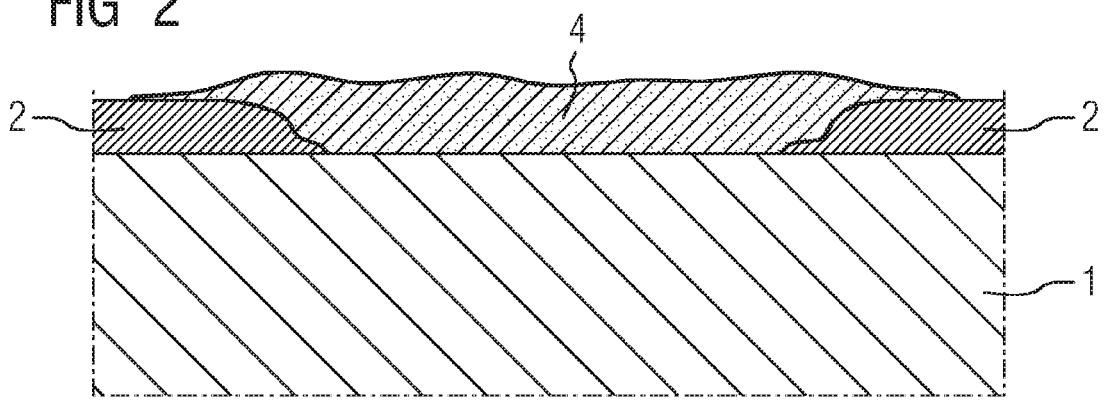
FIG. 2 shows the detail from a schematic cross section of a turbo machine blade according to FIG. 1, wherein the damaged region of the surface coating has been covered with a coating that has been produced by means of the coating composition of the invention.

FIG. 2 shows the detail from a schematic cross section of a turbo machine blade according to FIG. 1. By means of a brush, during the maintenance of the turbo machine, the damaged region of the coating is filled with the coating composition of the invention comprising anticorrosion pigments and hard material particles. This results in the coating 4. The turbo machine blade is repaired here in situ and thus enables rapid elimination of the damage found in the course of maintenance, in order to very rapidly bring the turbo machine back into operation. Anticorrosion pigments used here are zinc pigments, and hard material particles used are a mixture of equal proportions by weight of alumina particles having a $D_{50}$ of 38 μm and silica particles having a $D_{50}$ of 42 μm, for which an instrument of the Cilas 1064 type was used for measurement. The coating composition is an epoxy-based 2K coating composition having a weight ratio of paint base to curing agent of 4.5:1.

Additives including thixotropic agents and deaerating agents were added to the coating composition. Addition of a thixotropic agent adjusted the viscosity of the coating composition in such a way as to achieve a flow time of 100 seconds in a DIN 6 cup. This enables easy application of the coating composition even to a vertical surface of the component without noticeable running of the coating composition. Subsequently, the 2K coating composition cures owing to a chemical reaction of paint base and curing agent and provides a coating durable enough to be exposed to the fluid stream in the interior of the turbo machine as the outermost layer of the turbo machine blade.

Figure 3:
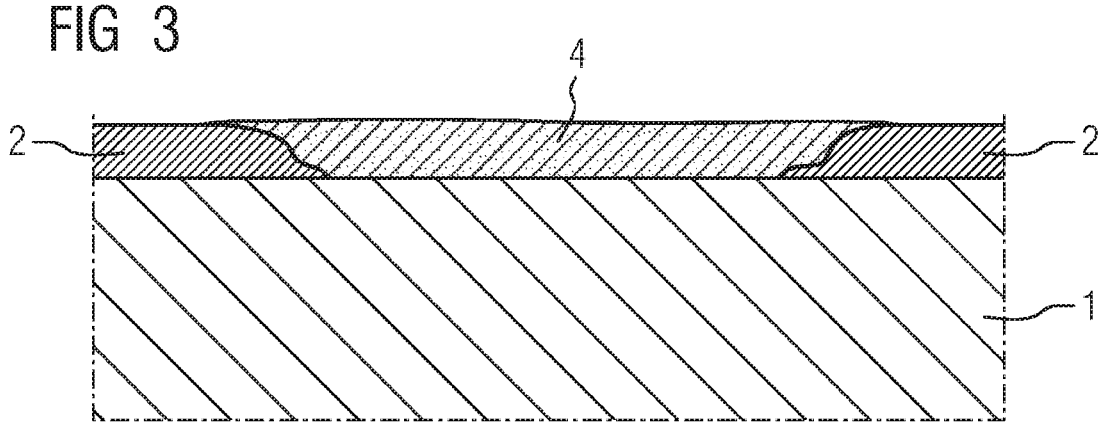
FIG. 3 shows the detail from a schematic cross section of a turbo machine blade according to FIG. 1, wherein the surface of the component has been smoothed after the repair to the surface.

FIG. 3 shows the detail from a schematic cross section of a turbo machine blade according to FIG. 2, wherein the surface of the coating 4 of the component has been mechanically smoothed after the repair to the surface. For this purpose, by means of a mechanical grinding process, excess material of the cured coating composition has been removed in order to provide a largely planar surface.

The invention claimed is:

1. A coating composition for coating of a compressor blade or vane of a gas turbine, which the compressor blade or vane is exposed to a fluid stream of the gas turbine, the coating composition comprising:
   anticorrosion pigments,
   a thixotropic agent,
   and
   hard material particles,
   wherein the coating composition comprises a 2k (two-component) room temperature curing coating composition comprising a paint base and a curing agent; and the coating composition is exposed to the fluid stream on the outermost layer of the compressor blade or vane.

2. The coating composition as claimed in claim 1, wherein a viscosity of the coating composition is in the range from 8000 mPas to 32 000 mPas.

3. The coating composition as claimed in claim 1, wherein a viscosity is adjusted to 40 to 240 seconds for a DIN 6 cup.

4. The coating composition as claimed in claim 1, wherein a ratio of the paint base to the curing agent is in the range from 1:1 to 7:1.

5. The coating composition as claimed in claim 1, wherein the hard material particles have a D50 in the range from 10 pm to 70 pm.

6. The coating composition as claimed in claim 1, wherein the anticorrosion pigments are selected from the group consisting of aluminum particles, zinc particles and mixtures thereof.

7. The coating composition as claimed in claim 1, wherein the hard material particles comprise ceramic particles, glass particles, carbides or mixtures thereof.

8. The coating composition as claimed in claim 1, wherein the coating composition comprises at least one deaerating agent.

9. A compressor blade or vane of a gas, said compressor blade or vane being suitable for exposure to a fluid stream of the gas turbine,
   wherein the compressor blade or vane, on a side exposed to the fluid stream, has a coating that has been obtained by means of a coating composition as claimed in claim 1.

10. A method of maintaining a gas turbine, the method comprising:
    using a coating composition as claimed in claim 1 for maintenance of the gas turbine.

11. The method as claimed in claim 10, wherein the compressor blade or vane to be maintained is coated in situ.

12. The method as claimed in claim 10, wherein the compressor blade or vane to be maintained is not deinstalled from the gas turbine.

* * * * *